(12) United States Patent
Ito et al.

(10) Patent No.: US 12,017,600 B2
(45) Date of Patent: Jun. 25, 2024

(54) AIRBAG DEVICE

(71) Applicant: Autoliv Development AB, Vargarda (SE)

(72) Inventors: Yoshiki Ito, Kanagawa (JP); Yutaka Nakajima, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/246,459

(22) PCT Filed: Jul. 30, 2021

(86) PCT No.: PCT/JP2021/028288
§ 371 (c)(1),
(2) Date: Mar. 23, 2023

(87) PCT Pub. No.: WO2022/064841
PCT Pub. Date: Mar. 31, 2022

(65) Prior Publication Data
US 2023/0365093 A1    Nov. 16, 2023

(30) Foreign Application Priority Data

Sep. 28, 2020   (JP) .............................. 2020-161575
Nov. 27, 2020   (JP) .............................. 2020-196969

(51) Int. Cl.
*B60R 21/207*   (2006.01)
*B60R 21/00*    (2006.01)
*B60R 21/231*   (2011.01)

(52) U.S. Cl.
CPC ...... *B60R 21/207* (2013.01); *B60R 21/23138* (2013.01); *B60R 2021/0048* (2013.01)

(58) Field of Classification Search
CPC ............ B60R 21/207; B60R 21/23138; B60R 2021/0048
See application file for complete search history.

(56) References Cited

U.S. PATENT DOCUMENTS 10,328,889 B2 *   6/2019   Sugie ................ B60R 21/01552
10,974,680 B2 *   4/2021   Ohmi .................. B60R 13/0212
(Continued)

FOREIGN PATENT DOCUMENTS

JP   2016-088349 A    5/2016
JP   2017-019425 A    1/2017
(Continued)

*Primary Examiner* — Faye M Fleming
(74) *Attorney, Agent, or Firm* — Harness, Dickey & Pierce, P.L.C.; Stephen T. Olson

(57) ABSTRACT

An airbag having a first cushion for protecting the side of the head of an occupant and a second cushion connected to the lower side thereof, the airbag device includes: an airbag for protecting the occupant seated in the seat of a vehicle, and an inflator that injects gas supplied to the airbag, the airbag in the expansion completed state where expansion and deployment are complete includes: the first cushion that covers at least the side of the head of the occupant, and a second cushion connected to the rear section of the first cushion at a height near the shoulder of the occupant which extends downward from this connecting point, and in the expansion completed state, the notched section is formed extending from the front towards the rear in between the first cushion and the second cushion.

12 Claims, 7 Drawing Sheets

(56) References Cited

U.S. PATENT DOCUMENTS

| | | | | |
|---|---|---|---|---|
| 2019/0016293 A1* | 1/2019 | Saso | ............... | B60R 21/23138 |
| 2023/0202419 A1* | 6/2023 | Ito | ................ | B60R 21/23138 |
| | | | | 280/728.2 |
| 2023/0294629 A1* | 9/2023 | Nakajima | ............ | B60R 21/233 |
| | | | | 280/729 |

FOREIGN PATENT DOCUMENTS

| | | | |
|---|---|---|---|
| JP | 2017-030638 | A | 2/2017 |
| JP | 2019-018593 | A | 2/2019 |
| JP | 2019-218013 | A | 12/2019 |
| JP | 2020-501971 | A | 1/2020 |
| KR | 10-2020-0092449 | A | 8/2020 |

* cited by examiner

AIRBAG DEVICE

TECHNICAL FIELD

The present invention relates to an airbag device or the like for protecting the head of an occupant.

BACKGROUND TECHNOLOGY

Conventionally, an airbag device provided with an airbag that expands and deploys to cover the head of an occupant when an impact is applied to a vehicle, such as when the vehicle is in a collision, is known.

Patent Document 1 describes an occupant protection device as this manner of airbag device. The airbag of the occupant protection device is configured as an integral bag body containing a front deployment section that deploys to the front of the seat relative to the head of the occupant and a pair of left and right side deployment sections that are connected to the front deployment section expand and deploy to the sides of the seat relative to the head of the occupant.

PRIOR ART DOCUMENTS

Patent Documents

Patent Document 1: Japanese Unexamined Patent Application 2017-019425

SUMMARY OF THE INVENTION

Problem to be Solved by the Invention

Also, for a conventional airbag, when viewed from the side, nearly the entire cushion is provided above the torso. Therefore, the inventors of the present application have investigated an airbag with a second cushion connected to the lower side of the first cushion to protect the side of the head of the occupant. As a result, it was learned that interference with the shoulder readily occurs in the process of expanding and deploying of the airbag.

In light of the manner of circumstances, an object of the present invention is to suppress interference with the shoulder of the occupant in the process of the airbag expanding and deploying for an airbag device provided with an airbag having a second cushion connected to the lower side of the first cushion for protecting the side of the head of the occupant.

Means for Solving the Problems

The present invention is an airbag device, including:
an airbag for protecting an occupant seated in a seat of a vehicle; and
an inflator that injects gas supplied to the airbag; wherein the airbag in an expansion completed state where expansion and deployment are complete includes:
a first cushion that covers at least the side of the head of the occupant; and
a second cushion that is close to shoulder height of the occupant, is connected to the back of the first cushion, and extends downward from this connecting point, and in the expansion completed state, a notched section is formed extending from the front towards the back between the first cushion and the second cushion.

For the present invention, an airbag in the expansion completed state may further include a duct section positioned at the back of the notched section that enables communication between the first cushion and the second cushion.

In the present invention, the inflator stowing section may be connected to the duct section.

For the present invention, of the first cushion, a side of head protecting section that protects the side of the head of the occupant may have a plurality of non-expandable sections lined up surrounding an expansion region that is expanded by gas from the inflator in addition to regions close to the connecting sections with the duct sections.

For the present invention, the plurality of non-expandable sections may be arranged at intervals on the side of head protecting section in the expansion completed state on a virtual straight line extending from the back to the front.

For the present invention, the plurality of non-expandable sections may be arranged at intervals on the side of head protecting section in the expansion completed state on a virtual straight line extending from the lower side to the upper side.

The present invention may be the first cushion in the expansion completed state further including a front protecting section that covers the front of the head of the occupant formed continuous to the front of the side of head protecting section in addition to the side of head protecting section that protects the side of the head of the occupant.

For the present invention, the region to the side of head protecting section side of the front protecting section may be a continuous expansion region from the upper end to the lower end.

For the present invention, a front side non-expandable section may extend vertically near the center in the left-right direction of the front protecting section.

For the present invention, the duct section may have a first communication port to the first cushion and a second communication port to the second cushion and with the airbag in a non-expanded and spread out state, the minimum width of the second communication port can be made larger as compared to the minimum width of the first communication port.

For the present invention, upon expansion and deployment of the airbag, in the case that the upper arm section of the occupant is positioned to the side of the torso of the occupant, after expansion and deployment of the second cushion behind the upper arm section is complete, the first cushion that has expanded and deployed forward expands and deploys from above toward the upper arm section.

For the present invention, relative to the first cushion that protects the side of the head of the occupant, a plurality of cushions are connected in a circumferential direction of the head so as to cover the front of the head and the side of the head on the opposite side.

For the present invention, with the first cushion and the second cushion in a state of being spread out flat and in an expansion completed state, the angle between the outer periphery of the first cushion and that outer periphery of the second cushion that form the notched section is an obtuse angle.

Effect of the Invention

With the present invention, in an expansion completed state, a notched section is formed between the first cushion that covers the side of the head of the occupant and the second cushion that extends downward from the connecting point with the first cushion and extends from the front side towards the back. Here, a conventional airbag that covers the head of the occupant (airbag described in Patent Document 1) has a lower end at a height of close to the shoulder of the occupant. Therefore, if a cushion extending downwards is connected without providing a notched section, there is likely to be interference between the upper part of this cushion and the shoulder of the occupant. In contrast, with the present invention, the notched section described above forms a gap between the first cushion and the second cushion during expansion and deployment. Therefore, interference of the airbag with the shoulder of the occupant during the expansion and deployment process can be suppressed.

MODE FOR CARRYING OUT THE INVENTION

Figure 1:
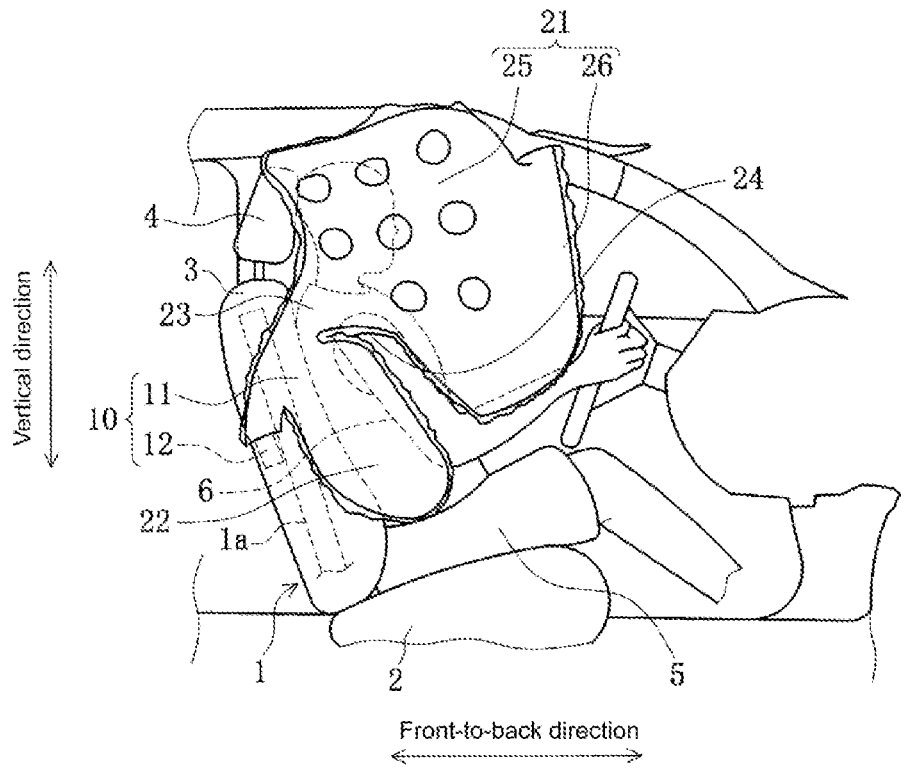
FIG. 1 is a view of an airbag in an expansion completed state from the side of a seat for an airbag device according to an embodiment.

Embodiments of the present invention are described in detail with reference to drawings below. Note that the embodiments below are examples of the present invention, and are not intended to limit the scope of the present invention, the application, or the uses thereof.

The "occupant" in the present invention is defined to be a frontal collision test dummy (Hybrid III AM50; human body dummy for frontal collision test set forth in specification [49CFR Part 572 Subpart E and O] of NHTSA [National Highway Traffic Safety Administration]) with a physique equivalent to the average male in the United States; having an approximate size of 175 cm height, 88 cm sitting height, and 78 kg weight.

In addition, in this specification, the terms "up" and "upwards" refer to the direction of the head of the occupant 5 seated in the regular position in a seat 1 provided in a vehicle and "down" and "downwards" refers to the direction towards the feet of the occupant 5. In addition, the terms "front" and "forward" refer to the front direction of the occupant 5 seated in the seat 1 in a regular position and "back" and "backwards" refer to a back direction of the occupant 5. In addition, the terms "left" and "left side" refer to the left-hand direction of the occupant 5 seated in the seat 1 in a regular position and "right" and "right side" refer to the right-hand direction of the occupant 5. The "regular position" refers to a position in the center of a seat cushion 2 of the seat 1 in the left-right direction and the back of the occupant 5 in contact with the seatback 3 of the seat 1 from top to bottom.

The present Embodiment is an airbag device 10 provided with an airbag 11 for protecting the occupant 5 seated in the seat 1 in the event that the vehicle such as an automobile is in a collision and an inflator 12 that injects gas supplied to the airbag 11. The airbag 11 is a bag configured by overlaying two cloths of the same shape and same size and sewing a prescribed location such as an outer periphery. The inflator 12 is a device for injecting gas that causes the airbag 11 to expand.

Here, as illustrated in FIG. 1, the seat 1 equipped with the airbag device 10 is provided with the seat cushion 2 and the seatback 3. The upper end section of the seatback 3 has a headrest 4 attached via a rod shaped support member. Note that for the seat 1, the headrest 4 may be integrally molded to the seatback 3.

Airbag in Expansion Completed State

The state of expansion and deployment of the airbag 11 being complete (hereinafter called "expansion completed state") is described below with reference to FIG. 1 to FIG. 4. Note that in the description of the airbag 11 in an expansion completed state, the occupant 5 is assumed to be seated in the regular position.

Figure 2:
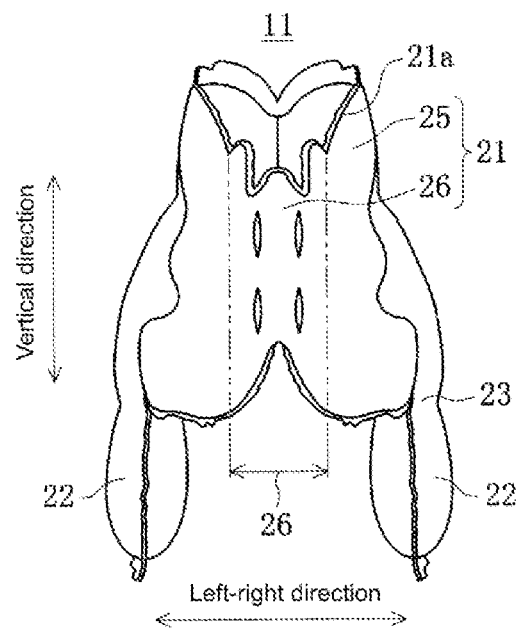
FIG. 2 is a view of an airbag in an expansion completed state from the front for an airbag device according to the embodiment.

As illustrated in FIG. 1 and FIG. 2, the airbag 11 includes a head cushion 21 that covers the head of the occupant 5 from the front to both sides of the head, a pair of torso cushions 22 that cover the occupant 5 on both sides of the torso, and a pair of duct sections 23 that connect each of the torso cushions 22 with the head cushion 21. The head cushion 21 corresponds to the first cushion that protects at least the side of the head of the occupant 5. The torso cushions 22 correspond to the second cushions connected to the back side section of the first cushion at a height of near the shoulder of the occupant 5 and extending downward from the connecting point. Of the head cushion 21, each of the torso cushions 22 is integrated with the side of head protecting section 25. In addition, the head cushion 21 includes a pair of side of head protecting sections 25 that cover both sides of the head of the occupant 5 and a front protecting section 26 that covers the front of the head of the occupant 5. Note that in the present specification, "height close to the shoulder" includes the same range as the shoulder in addition to close to the upper side or lower side of the shoulder.

Note that with the airbag 11, the pair of torso cushions 22 are provided symmetrically from side-to-side as viewed from the front. In addition, with the head cushion 21, the pair of side of head protecting sections 25 are provided symmetrically from side-to-side as viewed from the front.

Figure 3:
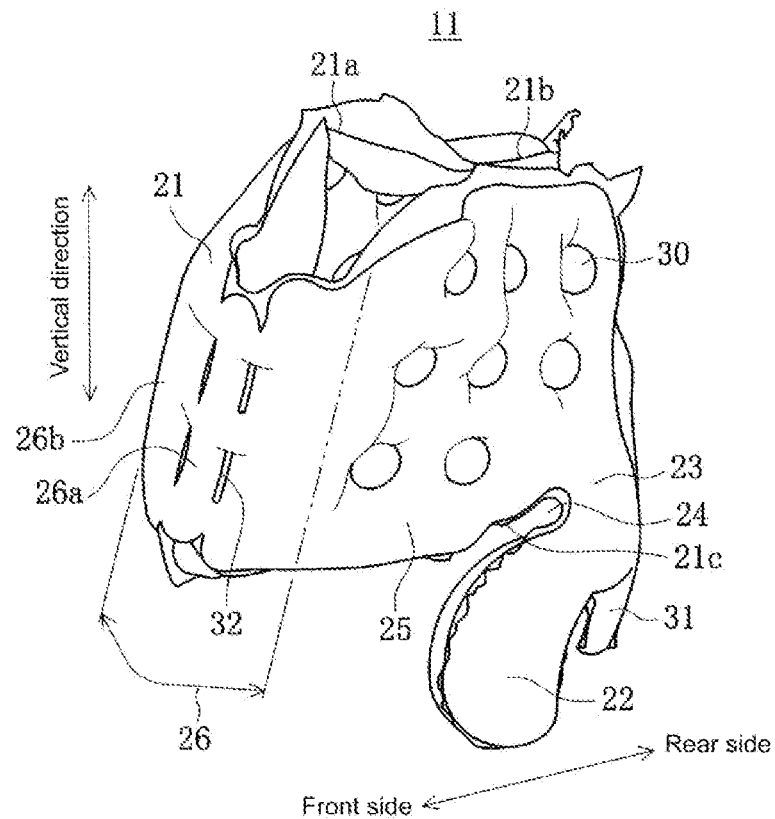
FIG. 3 is perspective view of an airbag in an expansion completed state viewed obliquely from the front for an airbag device according to the embodiment.

The side of head protecting sections 25 are formed in a size to receive the head of the occupant 5 moving sideways during a vehicle side collision as well as to receive the head of the occupant 5 moving obliquely forward. The front end part of the pair of side of head protecting sections 25 are connected together via the front protecting section 26, as illustrated in FIG. 2. As illustrated in FIG. 3, a gap is formed at the upper end section of the pair of side of head protecting sections 25 based on front sections 21a mutually separating while rear sections 21b are bonded together by means of sewing or the like.

Figure 4:
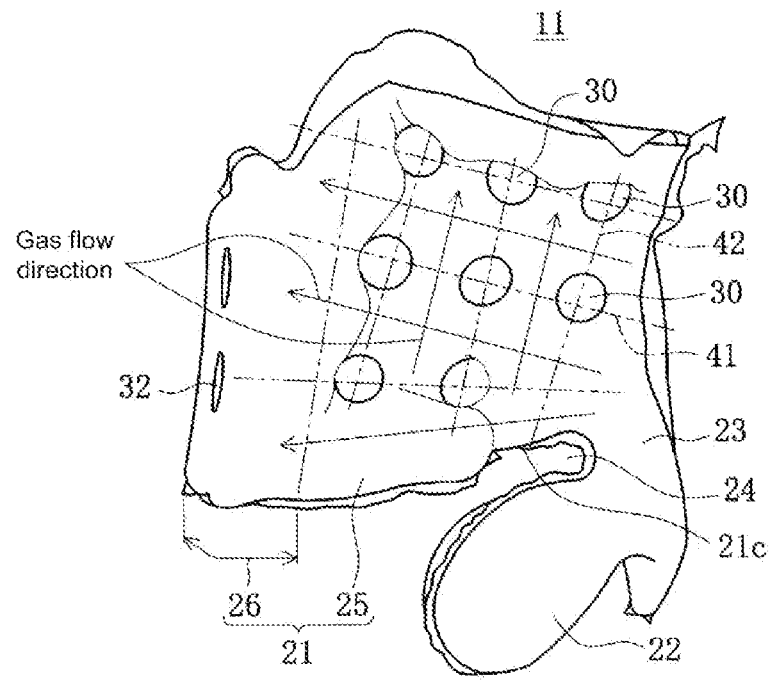
FIG. 4 is a view of an airbag in an expansion completed state from the side for an airbag device according to the embodiment.

As illustrated in FIG. 4, the side of head protecting section 25 is provided with a plurality of non-expandable sections 30 surrounded by expansion regions that are expanded by gas from the inflator 12. The non-expandable sections 30 are sections demarcated from the expansion region by bonding between the two cloths over the entire circumference of the region. The same goes for non-expandable sections 32 described below. The details of the non-expandable sections 30 will be described based on the spread flat state described below.

The front protecting section 26 is formed in a size enabling receiving the head of the occupant 5 moving forward when the vehicle is in a frontal collision. The front protecting section 26 is provided continuous with each of the pair of side of head protecting sections 25. The front protecting section 26 is formed symmetrically side-to-side as viewed from the front. A plurality of non-expandable sections 32 are also provided in the front protecting section 26. Each of the non-expandable sections 32 corresponds to a front side non-expandable section. The details of the non-expandable sections 32 will be described based on the spread flat state below.

The duct section 23 has a substantially tubular shape and forms a gas flow path connecting the head cushion 21 and the torso cushions 22. The duct section 23 extends downward from a rear end section of a lower end section 21c of the head cushion 21. An inflator stowing section 31 that is secured to a seat frame 1a of the seatback 3 is formed continuous to the lower side of the duct section 23. The torso cushions 22 are connected to the front of the duct section 23.

The torso cushions 22 exhibit a long body shape. The torso cushions 22 are formed with a size enabling receiving the torso of the occupant 5 moving to the side when the vehicle is in a side collision. The torso cushions 22 extend from the connecting section with the duct section 23 obliquely downward to the front along the side surface of the seatback 3. The torso cushions 22 cover a range from, for example, the chest to the abdomen of the torso of the occupant 5. Unlike the head cushion 21, the torso cushions 22 are not provided with non-expandable sections.

In the present Embodiment, notched sections (spacing) 24 extending from the front to the back are formed between the side of head protecting section 25 and the torso cushions 22 on the left and right sides of the occupant 5. The notched section 24 is a gap that extends along the upper arm section 6 of the occupant 5 gripping the steering wheel up to the shoulder or close the shoulder. The duct section 23 is positioned behind the notched section 24. The notched section 24 extends from the duct section 23 obliquely downward and forward. In a side view, the notched section 24 broadens toward the front. The notched section 24 satisfies a role of suppressing interference with the shoulder of the occupant 5 during the process of the airbag 11 expanding and deploying.

Airbag in a Spread Flat State

Next, the configuration of the airbag 11 with the airbag 11 in a non expanded and in a state spread out on a flat surface (hereinafter called "spread flat state") will be described with reference to FIG. 5. Note that the connection between the rear sections 21b at the upper end section of the pair of side of head protecting sections 25 must be released to enable setting the airbag 11 from the stowed in the seat 1 state to the spread flat state. In addition, the thick dashed line in FIG. 5 represents a sewing location.

Figure 5:
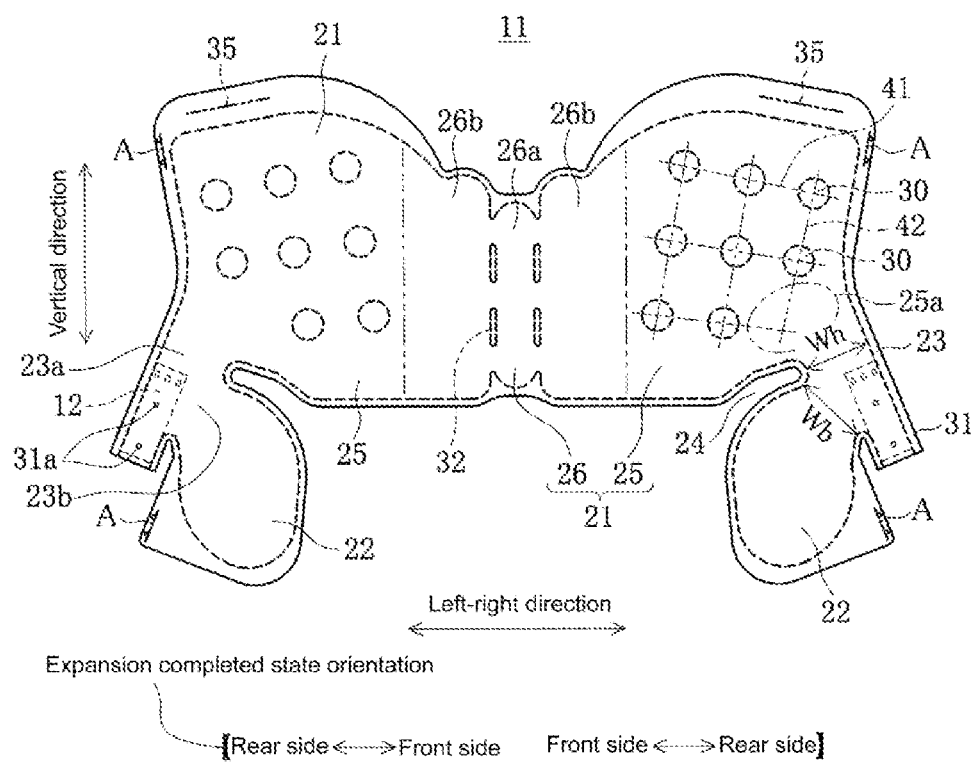
FIG. 5 is a plan view of the airbag device according to the embodiment in a spread flat state with the airbag spread out on a flat surface.

In the description of the airbag 11 in a spread flat state, the longitudinal direction of the head cushion 21 is called the "left-right direction" and the short hand direction is called the "vertical direction." For the airbag 11, the center section in the left-right direction in FIG. 5 becomes the front side in the expansion completed state. In addition, for the airbag 11, the upper side in FIG. 5 is also the upper side in the expansion completed state.

The airbag 11 is formed symmetrical side-to-side. The airbag 11 includes the horizontally elongated shaped head cushion 21, the pair of duct sections 23 connected to the outer end sections in the left-right direction at the lower end section of the head cushion 21, and the pair of torso cushions 22 connected inside each of the duct sections 23. The head cushion 21 is provided with the pair of side of head protecting sections 25 positioned to the outside in the left-right direction and with the front protecting section 26 positioned in the center section in the left-right direction.

With the head cushion 21, the center section of the upper portion of the outer periphery thereof is recessed downward. With the head cushion 21, the dimension in the vertical direction of the front protecting section 26 is shorter than that of the side of head protecting section 25. In addition, of the outer periphery of the head cushion 21, the lower portion extends in the lateral direction from the center section to the middle of the side of head protecting section 25 and from part way along thereof, extends obliquely upwards. A notched section 24 is formed in the section extending obliquely upwards. Note that of the lower section on the outer periphery of the head cushion 21, the section extending in the lateral direction may be somewhat below the position thereof in FIG. 5. In this case, the entrance of the notched section 24 becomes narrower.

With the side of head protecting section 25, a plurality of non-expandable sections 30 are arranged at intervals on a plurality of first virtual lines 41 extending left and right, and a plurality of non-expandable sections 30 are arranged at intervals on a plurality of second virtual lines 42 extending up and down. The first virtual lines 41 are mutually substantially parallel and the second virtual lines 42 are also mutually substantially parallel. The first virtual lines 41 and the second virtual lines 42 are substantially orthogonal to each other. The virtual lines 41 and 42 are virtual straight lines for describing the arrangement of the non-expandable sections 30 and do not actually exist. In addition, the shape of each of the non-expandable sections 30 is circular but may be another shape such as an elliptic shape.

Specifically, with the side of head protecting section 25, the plurality of non-expandable sections 30 are arranged at the grid points of the intersections of the plurality of first virtual lines 41 (three lines in FIG. 5) lined up vertically at a prescribed pitch and the plurality of second virtual lines 42 (three lines in FIG. 5) lined up side-to-side at a prescribed pitch. However, non-expandable sections 30 are not provided at the grid points closest to the connecting sections (gas inlets) with the duct sections 23. With the side of head protecting section 25, a plurality of non-expandable sections 30 are arranged in areas other than a region 25a that is close to the connecting section with the duct sections 23. Note that the arrangement of non-expandable sections 30 is not restricted to that of FIG. 5.

With the front protecting section 26, a plurality (two in FIG. 5) of non-expandable sections 32 are arranged at intervals in the vertical direction at a position close to the center on both sides of the center in the left-right direction. Each non-expandable section 32 has a longitudinally elongated shape. In the present Embodiment, providing of the non-expandable sections 32 causes the front protecting section 26 to bend backward at the positions of the non-expandable sections 32 in the expansion completed state, mitigating the sharpness of the leading side of the front protecting section 26. Note that the shape and arrangement of the non-expandable sections 32 are not restricted to the shape and arrangement of FIG. 5.

In addition, with the front protecting section 26, the frontal center section 26a spans from the upper end to the lower end between the left and right non-expandable sections 32 as a continuous expansion region with no non-expandable sections present. In addition, with the front protecting section 26, each of the frontal sections 26b to the side of head protecting section 25 side (rear side for the expansion completed state) of the non-expandable sections 32 also span from the upper end to the lower end as continuous expansion regions with no non-expandable section present.

The duct sections 23 extend from the side of head protecting section 25 obliquely downward to the outside. The lower side of the duct sections 23 are gas introduction sections the inflator stowing section 31 is connected to. The duct sections 23 include a first communication port 23a to the side of head protecting section 25 (first cushion) and a second communication port 23b to the torso cushions 22 (second cushions). In the present Embodiment, the minimum width Wb of the second communication port 23b is larger than the minimum width Wh of the first communication port 23a.

The torso cushions 22 are positioned below the side of head protecting section 25 with the notched section 24 interposed therebetween. The notched section 24 is formed from the lower section on the outer periphery of the side of head protecting section 25 and the upper section on the outer periphery of the torso cushions 22. The notched section 24 has a notched shape facing outward in an obliquely upward direction. The width of the notched section 24 gradually becomes smaller towards the rear side. Note that the shape of the notched section 24 may be a broader gap than the shape of FIG. 5 or may be narrower. In addition, the length of the notched section 24 may be longer than the length in FIG. 5 or the length may be shorter.

Stowing the Airbag and Securing to the Seat

For the airbag 11, the outer sections (two-dot chain line section 35 in FIG. 5) at the upper end section of the pair of side of head protecting sections 25 are bonded together by sewing or similar means. Further, in a state of being folded using a prescribed method, the airbag 11 is stowed in the seatback 3 of the seat 1.

At the rear end section in the expansion completed state (outer end section in left-right direction in spread flat state), the airbag 11 is provided with a securing section A to the seat frame 1a of the seatback 3. With the airbag 11, securing sections A are provided respectively near the upper end of the rear end section of each of the side of head protecting sections 25 and near the lower end of the rear end section of each of the torso cushions 22. In a stowed in the seat 1 state, the airbag 11 is secured to the seat frame 1a by tabs (not shown) attached to each of the securing sections A. Note that the positions of the securing sections A of the airbag 1 [sic] is not limited to the positions described in this paragraph.

In addition, at each of the inflator stowing sections 31 as well, the airbag 11 is secured to the seat frame 1a by stud bolts (not shown). The stud bolts are passed through insertion holes 31a of the inflator stowing section 31 and secure both the inflator 12 and the airbag 11 to the seat frame 1a. Two inflators 12 are used for the airbag 11.

Airbag Expansion and Deployment

Next expansion and deployment of the airbag 11 will be described with reference to FIG. 6.

Figure 6A:
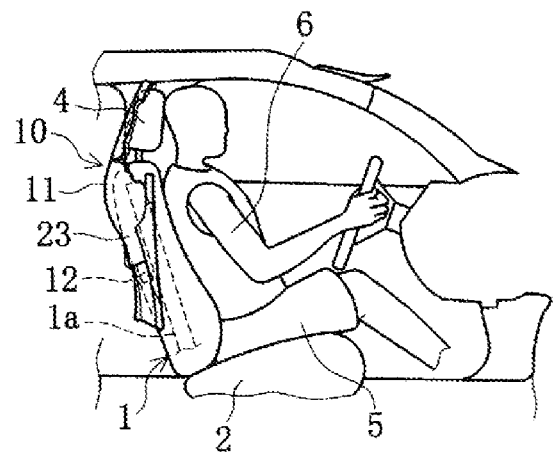
FIG. 6(a) illustrates the state just after starting expansion and deployment of the airbag for the airbag device according to the embodiment.

With the airbag device 10, when an impact is applied to the vehicle such as, for example, when the vehicle is in a collision, each of the inflators 12 that have received a signal from a sensor inject gas that starts to expand and deploy the airbag 11. FIG. 6(a) illustrates a state just after expansion and deployment of the airbag 11 has started. Gas injected from each of the inflators 12 passes through the duct sections 23 and is distributed to the head cushion 21 and the torso cushions 22. With the head cushion 21, gas flowing from the duct sections 23 flows into the side of head protecting section 25 and the front protecting section 26.

For the airbag 11, the head cushion 21 expands and deploys forward, passing over and along both sides of the headrest 4 so as to cover the head of the occupant 5. In addition, the pair of torso cushions 22 pass along both sides of the seatback 3 and expand and deploy forward (obliquely downward) toward the upper arm section 6 of the occupant 5. With the airbag 11, each of the torso cushions 22 complete expansion and deployment before the head cushion 21.

Figure 6B:
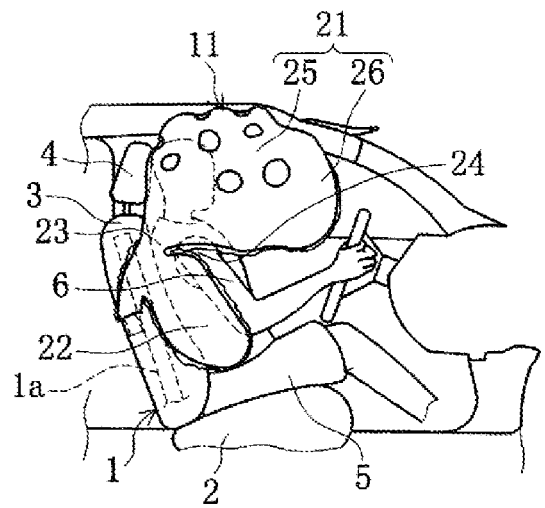
FIG. 6(b) illustrates a state of just after completion of expansion and deployment of a torso cushion.
Figure 6C:
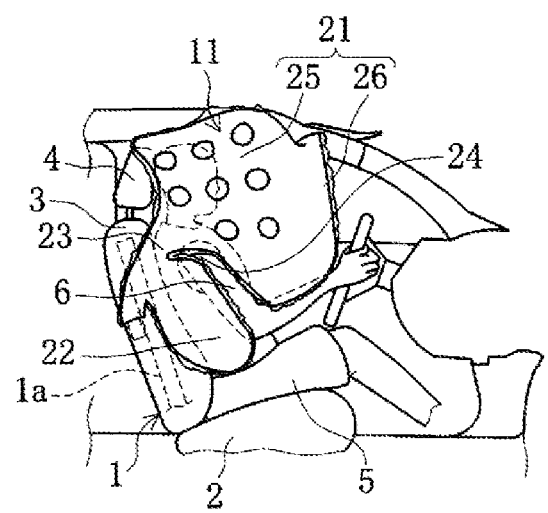
FIG. 6(c) illustrates a state of expansion and deployment of a cushion for a head being complete.

FIG. 6(b) illustrates the rear side of the upper arm section 6 of the occupant 5 in a state just after expansion and deployment of the torso cushions 22 is complete. In this state, the lower end of the head cushion 21 that expanded and deployed forward is near the height of the shoulder of the occupant 5. After expansion and deployment of the torso cushions 22 is complete, the head cushion 21 expands and deploys from above toward the upper arm section 6 at the front of the upper arm section 6 (positioned to the side of the torso) of the occupant 5 gripping the steering wheel. FIG. 6(c) illustrates a state of expansion and deployment of the head cushion 21 being complete.

Effects of the Present Embodiment

The airbag 11 according to the present Embodiment is a side collision compatible airbag (side of head protecting section 25 and torso cushions 22) integrated with a frontal collision compatible airbag (front protecting section 26) and thus is an omnidirectional compatible airbag. Thus, in addition to the head of the occupant 5, the torso of the occupant 5 can also be suitably protected. In addition, the notched section 24 is provided in the airbag 11. Therefore, a gap is formed between the side of head protecting section 25 and the torso cushions 22 during expansion and deployment enabling suppressing interference of the airbag 11 with the shoulder of the occupant 5 during the expansion and deployment process. Furthermore, this enables smooth expansion of the airbag 11 to the front of the occupant 5. Note that if the side of head protecting section 25 and the torso cushions 22 are fully connected and the gap between the occupant 5 on the door side and the trim is small, the airbag 11 does not readily expand and deploy in a smooth manner. The present embodiment is in particular advantageous in such cases.

In the present Embodiment, the airbag device 10 is configured so that upon completion of expansion and deployment of the torso cushions 22 behind the upper arm section 6 of the occupant 5 during expansion and deployment of the airbag 11, the head cushion 21 expands and deploys from above toward the upper arm section 6 at the front of the upper arm section 6. Therefore, the airbag 11 is able to expand and deploy in a smooth manner.

In the present Embodiment, duct sections 23 are provided for communication between the head cushion 21 and the torso cushions 22 enabling reducing the number of inflators 12 used for the airbag 11. Furthermore, the inflators 12 are arranged near the connecting sections between the side of head protecting section 25 and the duct sections 23 as well as near the connecting sections between the torso cushions 22 and the duct sections 23. Therefore, the side collision compatible airbag completes expansion and deployment prior to the frontal collision compatible airbag. The airbag 11 according to the present Embodiment enables compatibility with a side collision desirable for early occupant restraint.

In addition, with the present Embodiment, setting the gas flow path of the second communication port 23b connected to the torso cushions 22 larger than the first communication port 23a connected to the side of head protecting section 25 enables completing expansion and deployment of the torso cushions 22 earlier than that of the side of head protecting section 25. Therefore, the torso of the occupant 5 can be restrained from the side at an early timing.

With the present Embodiment, arranging the plurality of non-expandable sections 30 enables suppressing the thickness of the side of head protecting section 25 in the expansion completed state. In addition, with the side of head protecting section 25, a plurality of non-expandable sections 30 are arranged in areas other than a region 25a that is close to the connecting section with the duct sections 23. Therefore, gas flows smoothly from the duct sections 23 into the head cushion 21. Furthermore, as illustrated in FIG. 4, arranging the plurality of non-expandable sections 30 along each of the virtual lines 41 and 42 enables gas flow along each of the virtual lines 41 and 42 and rapidly expanding the head cushion 21.

In the present Embodiment, each of the non-expandable sections 32 is formed in a longitudinally elongated shape in the front protecting section 26 of the head cushion 21. Furthermore, the frontal center section 26a in front of the non-expandable sections 32 and the frontal sections 26b in back of the non-expandable sections 32 are both continuous expansion regions spanning from the upper end to the lower end. As a result, impact of the head of the occupant 5 that collides with the head cushion 21 during a frontal collision or the like can be mitigated. In addition, providing of the non-expandable sections 32 enables faster expansion of the frontal sections 26b as gas flows less readily in the frontal center section 26a of the head cushion 21.

First Modified Example of Embodiment

The airbag 11 according to the present Modified Example does not have a notched section 24 in the spread flat state but the notched section 24 is formed during the expansion and deployment process.

Figure 7:
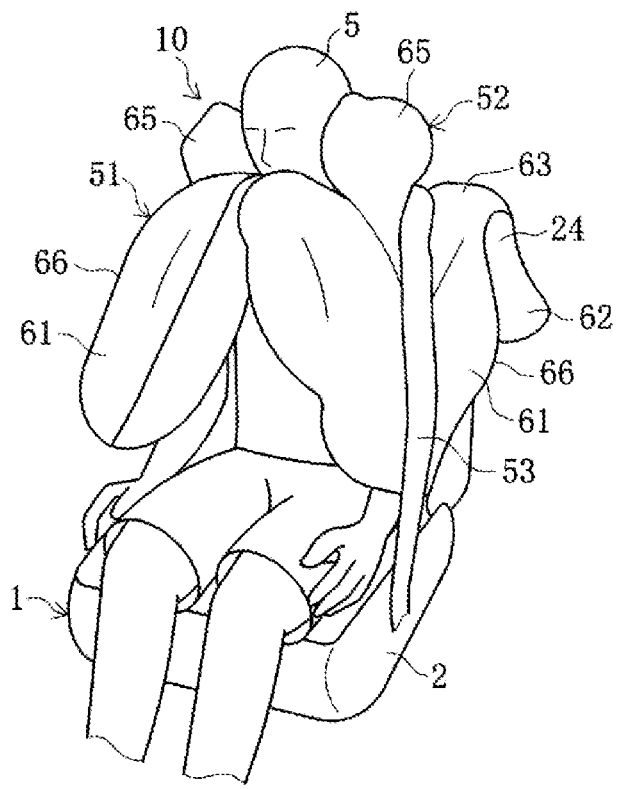
FIG. 7 is a view of a first airbag and a second airbag in an expansion completed state viewed obliquely from above the front of the seat for the airbag device according to Modified Example 1 of the embodiment.

As illustrated in FIG. 7, the airbag device 10 includes a first airbag 51 and a second airbag 52 that is a separate body from the first airbag 51. Inflators (not shown) are provided for each of the airbags 51 and 52. The first airbag 51 and the second airbag 52 are formed symmetrically side-to-side. In addition, the airbag device 10 is further provided with a belt 53 for restraining each of the airbags 51 and 52 from the outside in the expansion completed state.

Each of the airbags 51 and 52 include a first cushion 61 that protects the side of the head of the occupant 5 and the side of the torso and a second cushion 62 that is connected to the back portion of the first cushion 61 at a height near the shoulder of the occupant 5 and that extends downward from the connecting point 63. The notched section 24 is formed between the first cushion 61 and the second cushion 62.

Figure 8:
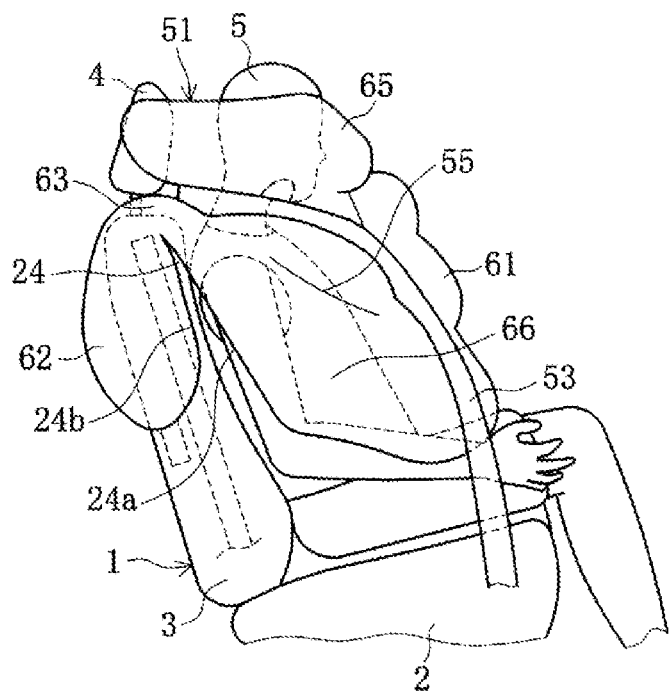
FIG. 8 is a view of the first airbag in an expansion completed state viewed from the side for the airbag device according to Modified Example 1 of the embodiment.

The first cushion 61 includes a side of the head chamber 65 for protecting the side of the head of the occupant 5 and a side of the torso chamber 66 for protecting the side of the torso of the occupant 5. As illustrated in FIG. 8, the side of the torso chamber 66 broadens from the connecting point 63 obliquely downward to the front and covers from the shoulder to the abdomen of the occupant 5. Of the outer periphery of the side of the torso chamber 66, a rear side outer periphery 24a that forms the notched section 24 is inclined relative to the front surface of the seatback 3 so as to separate from the seatback 3. In addition, the belt 53 extends from the upper section of the seat 1, passes between the side of the head chamber 65 and the side of the torso chamber 66 on the outer surface of each of the cushions 61 and 62, and passes inside or below the seat cushion 2.

The second cushion 62 extends from the connecting point 63 along and below the side surface of the seatback 3. An inflator is provided in the second cushion 62. Of the outer periphery of the second cushion 62, the front side outer periphery 24b that forms the notched section 24 extends along the front surface of the upper part of the seatback 3.

Figure 9:
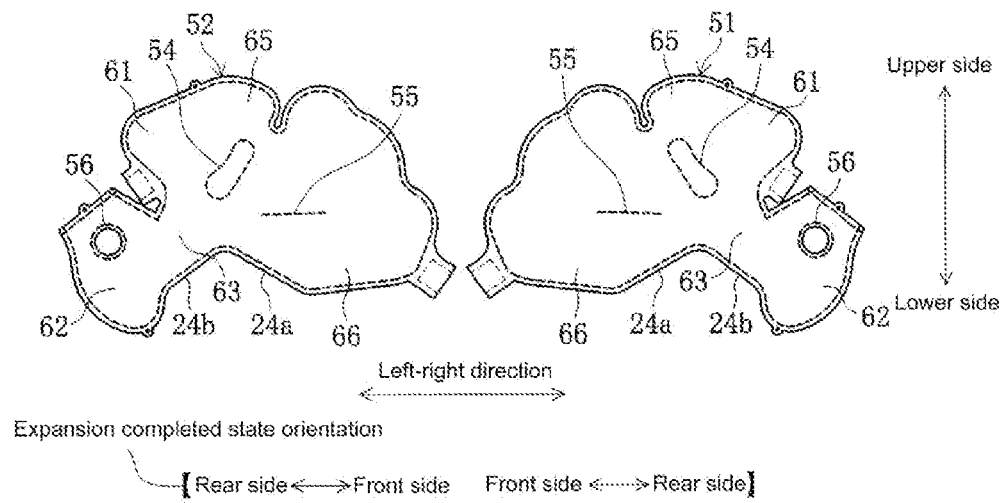
FIG. 9 is a plan view of the airbag device according to Modified Example 1 of the embodiment with the first airbag and the second airbag in a spread flat state spread out on a flat surface.

FIG. 9 is a diagram of each of the airbags 51 and 52 in the spread flat state in the expansion completed state as viewed from the side of the occupant 5. For each of the airbags 51 and 52, the inside in the left-right direction in FIG. 9 is the front side for the expansion completed state. Note that in FIG. 9, description of the belt 53 is omitted.

In the spread flat state, the angle formed by the rear side outer periphery 24a and the front side outer periphery 24b that form the notched section 24 in the expansion completed state is an obtuse angle. In addition, with the first cushion 61, an elongated non-expandable section 54 is provided at the boundary between the side of the head chamber 65 and the side of the torso chamber 66. In the expansion completed state, the belt 53 passes over the outer surface of the non-expandable section 54. In addition, a linear non-expandable section 55 extends in the left-right direction on the side of the torso chamber 66. In addition, an inflator connecting section 56 is provided on the second cushion 62. Each airbag 51 is secured to the seat by the second cushion 62.

For each of the airbags 51 and 52, the first cushion 61 bends inwardly at the connecting point 63 of the first cushion 61 and the second cushion 62 during the expansion and deployment process. This bend enables the rear side outer periphery 24a of the first cushion 61 to get closer to the front side outer periphery 24b of the second cushion 62 forming a notch 24 therebetween in the expansion completed state. With the Modified Example, interference of the airbag 11 with the shoulder of the occupant 5 during the expansion and deployment process can be suppressed.

Second Modified Example of Embodiment

In the present Modified Example, the point where the notched section 24 is formed on the airbag 11 in the expansion completed state is the same as that of the Embodiment but the form of the airbag 11 differs from the Embodiment.

Figure 10:
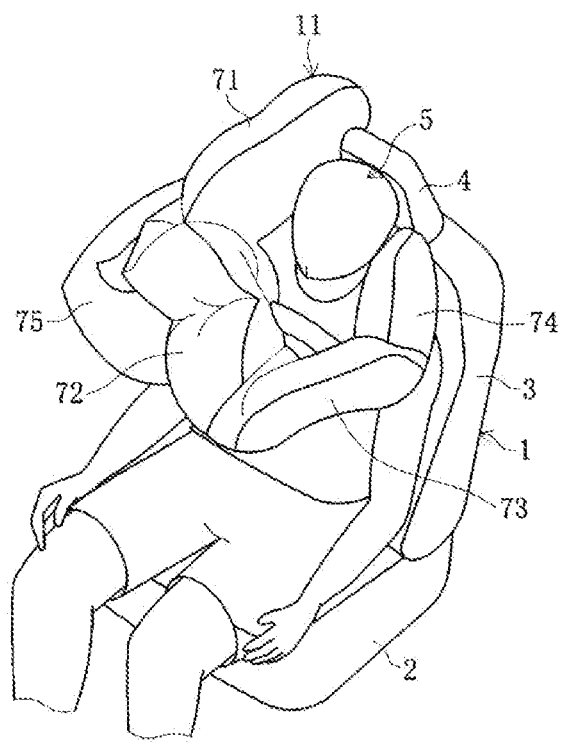
FIG. 10 is a view of an airbag in an expansion completed state viewed obliquely from above the seat for the airbag device according to Modified Example 2 of the embodiment.
Figure 11A:
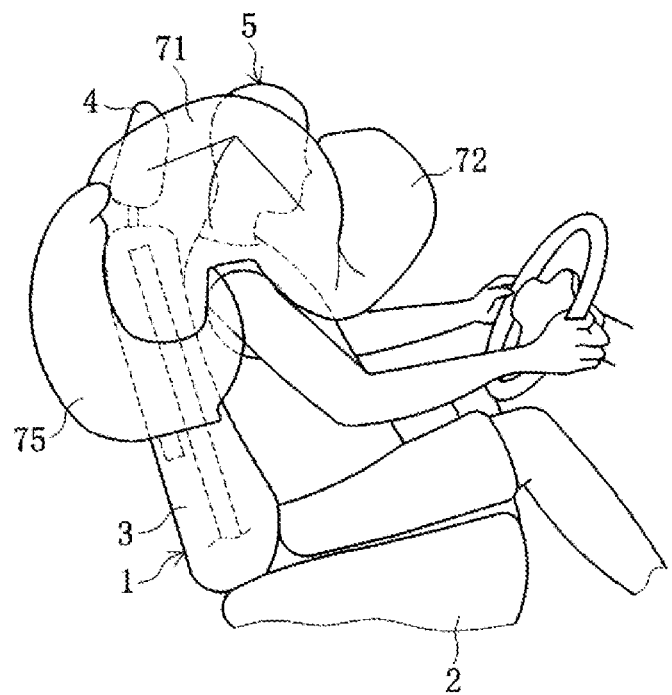
FIG. 11(a) illustrates a state part way through expansion and deployment of the airbag for the airbag device according to Modified Example 2 of the embodiment.
Figure 11B:
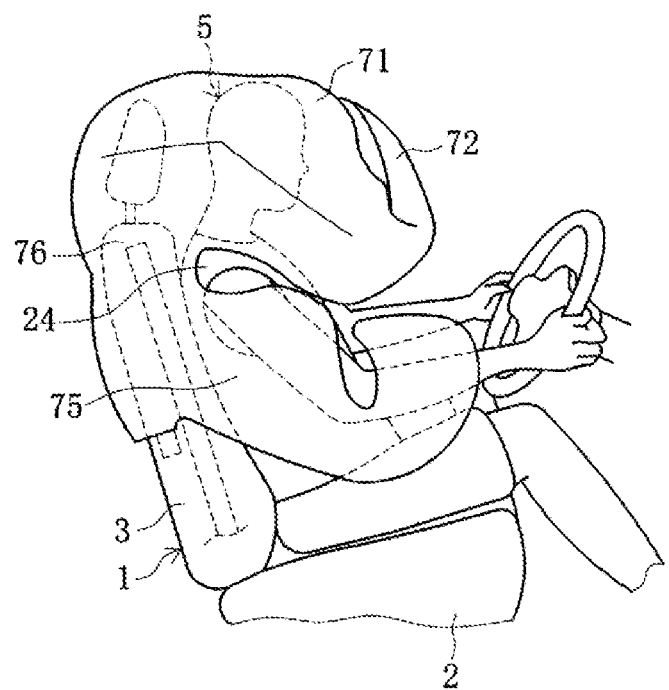
FIG. 11(b) illustrates a state of expansion and deployment of the airbag being complete.

As illustrated in FIG. 10, the expansion completed state airbag 11 with expansion and deployment completed includes a plurality of head cushions 71 to 74 for covering the head of the occupant 5 and a torso cushion 75 for covering the side of the torso of the occupant 5. The first head cushion 71 of the head cushions 71 to 74 corresponds to the first cushion that covers the side of the head of the occupant 5. The torso cushion 75 corresponds to the second cushion connected to the back side section of the first cushion at a height of near the shoulder of the occupant 5 and extending downward from the connecting point 76. The torso cushion 75 is connected to the first head cushion 71. As illustrated in FIG. 11(*a*) and FIG. 11(*b*), the torso cushion 75 expands and deploys from the upper section of the seat 1 seatback 3 and in the expansion completed state, extends obliquely downward from the connecting point 76 with the first head cushion 71 towards the front. In the Modified Example, an inflator (not shown) is provided in the torso cushion 75.

With the plurality of head cushions 71 to 74 in the expansion completed state, relative to the first head cushion 71, a second cushion 72, third cushion 73, and fourth cushion 74 are connected in this order so as to cover the front of the head, and the side of the head on the opposite side. The first head cushion 71 covers a first side of the head of the occupant 5. The second cushion 72 covers the front of the head of the occupant 5. The third cushion 73 is provided on the opposite side as the first head cushion 71 covers the head of the occupant 5 obliquely from the front. The fourth cushion 74 passes over the shoulder of the occupant 5 and covers the side of the head on the opposite side as the first head cushion 71. In the expansion completed state, the notched section 24 is formed extending from the front to the back between the first head cushion 71 and the torso cushion 75. With the Modified Example, interference of the airbag 11 with the shoulder of the occupant 5 during the expansion and deployment process can be suppressed.

Additional Modified Example of Embodiment

In the Embodiment described above, the head cushion 21 may be formed without the front protecting section 26. In this case, the front protecting section 26 portion can be replaced with a sheet material composed of a non-expandable section. In addition, the pair of side of head protecting sections 25 may be connected between the front sections 21*a* of the upper end sections rather than connecting at the front.

In the Embodiment described above, the torso cushions 22 may be provided on only a first side of the occupant 5. In this case, a second side of the occupant 5 may be protected by another airbag 11.

In the embodiment described above, the airbag 11 is formed symmetrically from side-to-side but may be formed not symmetrical side-to-side. For example, the sizes of the torso cushions 22 may be different on the left and the right.

In the Embodiment described above, the side of head protecting section 25 and torso cushions 22 may be connected using a sheet material through which gas does not flow in place of the duct sections 23. In this case, inflators 12 may be provided separately for the head cushion 21 and the torso cushions 22.

In the Embodiment described above, the airbag 11 is formed by sewing two pieces of cloth together but may be formed using so-called "one-piece weaving" technology.

INDUSTRIAL APPLICABILITY

The present invention can be applied to an airbag device or the like for protecting the head of an occupant.

DESCRIPTION OF CODES

1. Seat
5. Occupant
10. Airbag device
11. Airbag
12. Inflator
21. Head cushion (first cushion)
22. Torso cushion (second cushion)
23. Duct section
24. Notched section
25. Side of head protecting section
26. Front protecting section

The invention claimed is:

1. An airbag device, the airbag device comprising:
an airbag for protecting an occupant seated in a seat of a vehicle; and
an inflator for injecting gas to deploy the airbag;
wherein:
the airbag in an expansion completed state where expansion and deployment are complete includes:
a first cushion configured to cover at least a side of a head of the occupant; and
a second cushion connected to a back of the first cushion, and extending downward from a connecting point between the first cushion and the second cushion; and
a notched section extending from a front towards a back between the first cushion and the second cushion, and
wherein the airbag in the expansion completed state further comprises a duct section positioned at the back of the notched section that enables communication between the first cushion and the second cushion, the duct section connected to a stowing section of the inflator.

2. The airbag device according to claim 1, wherein of the first cushion, a side of head protecting section that protects the side of the head of the occupant has a plurality of non-expandable sections arranged surrounding an expansion region that is expanded by gas from the inflator in addition to regions close to connecting parts with the duct sections.

3. The airbag device according to claim 2, wherein the non-expandable sections of the plurality of non-expandable sections are arranged at intervals on the side of head protecting section in the expansion completed state on a virtual straight line extending from the back to the front.

4. The airbag device according to claim 2, wherein the non-expandable sections of the plurality of non-expandable sections are lined up on the side of head protecting section in the expansion completed state on a virtual straight line extending from a lower side to an upper side.

5. The airbag device according to claim 1, wherein the first cushion in the expansion completed state further includes a front protecting section configured to cover the front of the head of the occupant formed continuous to the front of the side of head protecting section in addition to the side of head protecting section for protecting the side of the head of the occupant.

6. The airbag device according to claim 5, wherein a region to the side of head protecting section side of the front protecting section is a continuous expansion region from an upper end to a lower end.

7. The airbag device according to claim 6, wherein a front side non-expandable section extends vertically near a center in a left-right direction of the front protecting section.

8. The airbag device according to claim 1, wherein the duct section has a first communication port to the first cushion and a second communication port to the second cushion and with the airbag in a non-expanded and spread out state, a minimum width of the second communication port is larger as compared to a minimum width of the first communication port.

9. The airbag device according to claim 1, wherein relative to the first cushion for protecting the side of the head of the occupant, a plurality of cushions are connected for circumferentially covering a front of the head and a side of the head on an opposite side.

10. The airbag device according to claim 1, wherein with the first cushion and the second cushion in a state of being spread out flat and in an expansion completed state, an angle between an outer periphery of the first cushion and that outer periphery of the second cushion that form the notched section is an obtuse angle.

11. An airbag device, the airbag device comprising:
an airbag for protecting an occupant seated in a seat of a vehicle; and
an inflator for injecting gas to deploy the airbag;
wherein:
the airbag in an expansion completed state where expansion and deployment are complete includes:
    a first cushion configured to cover at least a side of a head of the occupant; and
    a second cushion connected to a back of the first cushion, and extending downward from a connecting point between the first cushion and the second cushion; and
    a notched section extending from a front towards a back between the first cushion and the second cushion, and
wherein the first cushion in the expansion completed state further includes a front protecting section that covers the front of the head of the occupant formed continuous to the front of the side of head protecting section in addition to the side of head protecting section that protects the side of the head of the occupant.

12. An airbag device, the airbag device comprising:
an airbag for protecting an occupant seated in a seat of a vehicle; and
an inflator for injecting gas to deploy the airbag;
wherein:
the airbag in an expansion completed state where expansion and deployment are complete includes:
    a first cushion configured to cover at least a side of a head of the occupant; and
    a second cushion connected to a back of the first cushion, and extending downward from a connecting point between the first cushion and the second cushion; and
    a notched section extending from a front towards a back between the first cushion and the second cushion, and
wherein relative to the first cushion for protecting the side of the head of the occupant, a plurality of cushions are connected for circumferentially covering a front of the head and a side of the head on an opposite side.

* * * * *